United States Patent [19]
Asakura et al.

[11] 3,966,686
[45] June 29, 1976

[54] AROMATIC POLYAMIDE-TYPE FILMS

[75] Inventors: Toshiyuki Asakura; Masaaki Itoga, both of Otsu; Takeshi Hayakawa, Kyoto; Masamitu Tanimura, Otsu, all of Japan

[73] Assignee: Toray Industries, Inc., Tokyo, Japan

[22] Filed: Dec. 24, 1974

[21] Appl. No.: 536,256

[30] Foreign Application Priority Data
Dec. 28, 1973 Japan.................................. 49-1682

[52] U.S. Cl............................. 260/78 A; 260/47 ET; 260/857 PA; 264/184; 264/212
[51] Int. Cl.²............................................ C08G 69/46
[58] Field of Search ....... 260/78 A, 857 PA, 47 ET; 264/184, 212

[56] References Cited
UNITED STATES PATENTS

| | | | |
|---|---|---|---|
| 3,472,819 | 10/1969 | Stephens............................ | 260/78 A |
| 3,652,510 | 3/1972 | Blomberg............................ | 260/78 A |
| 3,751,546 | 8/1973 | Horoldt.............................. | 264/184 |
| 3,767,756 | 10/1973 | Blades................................ | 264/184 |
| 3,796,693 | 3/1974 | Morgan et al. .................... | 260/78 A |
| 3,817,941 | 6/1974 | Blair et al. ........................ | 260/78 A |

*Primary Examiner*—Lucille M. Phynes

[57] ABSTRACT

Aromatic polyamide-hydrazide films, consisting of p-benzamide p-phenylene terephthalamide and/or terephthaloyl hydrazide recurring units, as major chain constituents, are removed from inorganic residue by an aqueous mixture which dissolves or swells the films, and are heated up to their crystallization temperatures in tension, giving rise to high tensile strength and modulus, good hygroscopic dimensional stability and excellent electrical insulation properties.

11 Claims, 1 Drawing Figure

AROMATIC POLYAMIDE-TYPE FILMS

BACKGROUND OF THE INVENTION

Aromatic polyamide-hydrazide films, consisting of p-phenylene terephthalamide, p-benzamide and/or terephthaloyl hydrazide recurring units may have conferred upon them high tenacity and thermal stability, according to their chemical structure. But they are extremely sensitive to humidity, due to the presence of hydrophilic groups, such as amides and hydrazides, in their molecular chains. For instance, they often show large water absorption such as more than 10%, large hygroscopic expansion, unstable tensile strength and modulus and poor electrical properties (dielectric loss, insulation resistance, etc.). They also show poor flatness (tending to curl) and insufficient thermal durability.

This invention provides improved aromatic polyamide-type films, characterized by excellent mechanical strength, thermal stability, hygroscopic dimensional stability and other excellent properties, and also relates to a method of manufacturing those films.

SUMMARY OF THE INVENTION

This invention relates to aromatic polyamide-type films of excellent hygroscopic dimensional stability, mechanical strength and electrical properties. This invention also relates to methods of improving the flatness and thermal durability of aromatic polyamide-type films selected from the group consisting of at least one of p-benzamide, p-phenylene terephthalamide and terephthaloyl hydrazide recurring units as major chain constituents. This invention provides improved films prepared from aromatic polyamides, polyhydrazides, polyamide-hydrazides or their copolymers, which are characterized by a density of more than 1.41 g/cm³ and a planar orientation coefficient of at least 0.65 obtained by the X-ray pole figure method described hereinafter. These films also have an ionic inorganic residue of less than 500 ppm and an inherent viscosity greater than 1.0. Furthermore, these films have a tensile strength in excess of 30 kg/cm², a Young's modulus larger than 600 kg/mm² both in the machine and transverse directions and a hygroscopic linear expansion coefficient of less than $2 \times 10^{-5}$ mm/mm/%RH in one direction. This invention also provides a method of preparing the above mentioned films by unique combinations of film casting, stretching and heat treatment procedures.

DETAILED DESCRIPTION OF THE INVENTION

Figure 1:
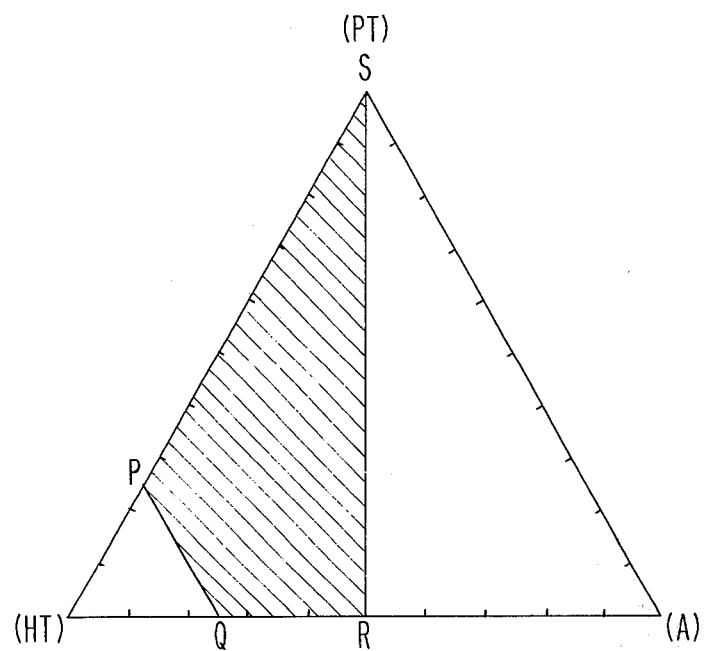
FIG. 1 shows a preferred composition of aromatic polyamide-type films according to this invention in terms of triangle coordinates, where HT, A and PT refer to terephthaloyl hydrazide, p-benzamide and p-phenylene terephthalamide, respectively.

This invention relates to polymeric films prepared from aromatic polyamides, polyhydrazides, polyamide-hydrazides or their copolymers, and to a method of manufacturing those films. Those polymers have hydrophilic groups in their molecular chains, such as amides and hydrazides and, consequently, those films are extremely sensitive to humidity in nature. Although they have potentially excellent stiffness and thermal stability, they have serious defects, such as hygroscopic dimensional instability, poor flatness, low electrical insulation resistance, high coefficient of friction, unstable mechanical strength, thermal durability, etc., which have been obstacles to their practical applications. This invention provides aromatic polyamide-type films, substantially consisting of at least one of p-benzamide, p-phenylene terephthalamide and terephthaloyl hydrazide recurring units as main constituents, which have a density of more than 1.41 g/cm³, preferably more than 1.44 g/cm³, at 25° C and 0% RH, and a planar orientation coefficient of more than 0.65, preferably larger than 0.75, obtained by the X-ray pole figure method described hereinafter. This invention also provides the above mentioned films which have a tensile strength of greater than 30 kg/mm² and a tensile modulus greater than 600 kg/mm² both in the machine direction and in the transverse direction, at 25° C and 75% RH, a water absorption of less than 3.0 weight % at 25° C and 75% RH and a hygroscopic linear expansion coefficient of less than $2.0 \times 10^{-5}$ mm/mm/% RH at least in one direction. Furthermore, this invention provides the above mentioned films, free from curling, which have an inherent viscosity of more than 1.0 and an ionic inorganic residue of less than 500 ppm.

This invention also provides a method of preparing such films, comprising the removal of organic solvents and/or inorganic compounds from said polymeric films and the heating of the films to their crystallization temperatures, kept in tension in the machine direction and in the transverse direction, so that the treated films may have a density of more than 1.41 g/cm³ at 25° C and 0% RH, an inherent viscosity of more than 1.0 and a planar orientation coefficient or more than 0.65 obtained by the X-ray pole figure method.

The recurring units of the polymers of this invention, i.e., p-benzamide, p-phenylene terephthalamide and terephthaloyl hydrazide are defined as follows:

p-benzamide:

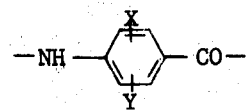

p-phenylene terephthalamide:

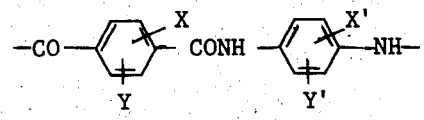

terephthaloyl hydrazide:

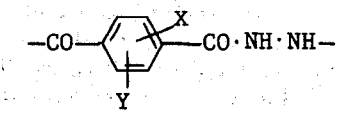

Here, X, Y, X' and Y' are selected from the group consisting of halogen (Cl or Br), hydrogen or the nitro group.

Although the polymers of this invention are to be essentially composed of the above three recurring units, they may contain other units, to the extent of less than approximately 30 mol %, the balance of at least 70 mol % being made up of the aforesaid three recurring units, if the effects of this invention are not interfered with, such as m-phenylene

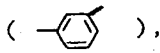

urethane (—NHCOO—), urea (—NHCONH—), ester (—COO—), ether (—O—) bonds, etc.

The combinations of the above three recurring units are shown by the triangle coordinates in FIG. 1, where HT, A and PT refer to terephthaloyl hydrazide, p-benzamide and p-phenylene terephthalamide, respectively. Although any point within the triangle is adaptable to this invention, the composition corresponding to the quadrangular area enclosed by P, Q, R and S is particularly effective to obtain films having the excellent properties of this invention. Here, P, Q, R and S are the following molar ratios.

P: HT/A/PT = 75/0/25 (mol %)
Q: HT/A/PT = 75/25/0
R: HT/A/PT = 50/50/0
S: HT/A/PT = 0/0/100

Those polymers can be prepared by the low temperature solution polycondensation of p-phenylene diamine, p-amino benzoyl hydrazide and/or terephthaloyl dihydrazide, and terephthaloyl chloride, or p-amino benzoyl chloride (or their halogenated or nitrated derivatives) in polar amide-type solvents. Examples of solvents are N,N-dimethyl-acetamide (DMAC), N-methyl-2-pyrolidone (NMP), hexamethyl phosphoramide, tetramethyl urea, etc. In order to increase the solubility and stability of prepared polymer solutions, an ionic inorganic salt, such as lithium chloride, magnesium chloride, calcium chloride, lithium nitrate, etc., can be added to the solvent. Organic tertiary amines, such as pyridine and dimethyl aniline, can also increase solubility and stability.

Polymerization reactions may proceed at lower than 60° C, favorably −20° to 50° C.

The prepared polymer solution can be used for the following film casting. But it is better to neutralize or eliminate hydrochloric acid generated by the polymerization reaction, by calcium hydroxide, lithium hydroxide, calcium acetate, pyridine, dimethyl aniline, propylene oxide, etc. Or the polymer, separated from the solvent and inorganic additives, can be dissolved again in the same solvent, or in others such as sulfuric acid.

Such a polymer solution can be extruded through a narrow die slit and cast onto a moving metal belt or drum in an oven, or directly into an aqueous medium. The solvent is evaporated from the cast film or in the latter case the solvent and inorganic additive are simultaneously extracted by the aqueous medium. Or the polymer solution in an organic solvent and inorganic additive may be cast onto the metal belt or drum, at first, where the solvent is evaporated from the cast film in heated air, and then the self-supporting film is peeled from there and dipped into the aqueous mixture, where the ionic inorganic additive and the residual solvent are extracted. However, such an ionic inorganic compound is not always completely removed, but a certain amount, usually more than 1%, is still retained in the final film. We have found that such a film shows insufficient flatness and that, unexpectedly, it can be improved by the reduction of the inorganic residue to the extent of less than 500 ppm. This is also found to be effective to the improvement of thermal stability and practical high temperature durability as heat resistant electrical insulation materials. For example, the half-period of the reduction of tensile elongation at 200° C in air can be prolonged from about 100 hours to more than 250 hours. The above-mentioned ionic inorganic compounds are meant to be inorganic compounds with ionic bonds, in particular, halides and nitrates of alkali metals and alkali earth metals, and sulfuric acid. In order to accomplish the achievement of such a small amount of ionic inorganic residue, less than 500 ppm, in the final film, it is desirable to optimize the conditions to enhance the extraction effect of an aqeuous medium for the ionic compounds in the polymer films, such as extraction temperature, ionic concentration in the aqueous medium, fluid velocity on the film surface, etc., in addition to the prevention of contamination with such inorganic compounds through the manufacturing processes. But it is unsatisfactory, depending on the thickness and chemical composition of the film. The most effective method is to use, as an extraction medium, a mixture of water and an organic solvent which can dissolve or swell the polymer film, such as dimethyl acetamide, dimethyl formamide, N-methyl-2-pyrolidone, tetramethyl urea, γ-butyrolactone, hexamethyl phosphoramide and N-methyl butyrolactum, and to maintain the state of swelling in the extraction medium, so far as the self-support and dimensional stability of the film in the medium are unaffected.

The extraction temperature is preferably from room temperature to 90° C, more preferably from 40° to 80° C and it is necessary that the film be kept in tension in order to prevent any significant free shrinkage during the extraction. The concentration of the above-mentioned organic solvent in the extraction medium (water-solvent mixture) is desirably maintained from 5 to 70%, preferably from 10 to 50%, based on the total weight. If the film containing such a solvent enters the extraction bath, pure water may be supplied to the bath by a controlled rate, where the solvent will be extracted by water, resulting in the above concentration in equilibrium.

With extraction by pure water, the film may form a dense structure in its surface layer and a coarse structure in its core. In such a condition, although the extraction rate is greater at the initial stage, it levels off at an earlier stage, with the result that a larger amount of inorganic residue remains in the film. With the mixture which can swell or dissolve the film, as mentioned above, such a two-phased structure is hardly formed, which enables the removal of inorganic residue, particularly in a later stage of the extraction, by keeping the film in the medium somewhat swollen.

If the polymer solution is cast onto a moving metal surface where the solvent is evaporated in advance, it is important that the residual solvent in the final stage of the process or when the film is dipped into the aqueous medium, must be kept more than 50%, based on the weight of net polymer. If the film on the metal surface is excessively dry, a hazy skin layer is sometimes formed on the free surface (evaporation surface), which resembles the phase separation of a solution where a fine structure may be observed by an optical microscope.

With such a film, the removal of ionic compounds may be extremely retarded in the aqueous medium. Therefore, this invention is effective to retard the formation of the two-phase structure and complete the removal of ionic compounds, with minimum decrease of extraction rate.

Such a film, almost free from ionic inorganic residue, is rinsed in water, dried in heated air and then, if necessary, stretched in the machine direction and in the transverse direction and subjected to heat treatment. It is necessary for the final film to have a sufficient density and planar orientation, i.e., a density of more than 1.41 g/cm$^3$, preferably more than 1.44 g/cm$^3$ at 25° C and 0% RH and a planar orientation coefficient higher than 0.65, preferably higher than 0.75. In order to accomplish these structural conditions, the film must be constrained dimensionally or kept from free shrinkage in both directions during the heat treatment. If the film does not have sufficient planar orientation before this heat treatment, it must be stretched before or during this treatment. The planar orientation of the film can be obtained by so-called biaxial stretching. The film is continuously drawn in the machine direction by a velocity difference of pairs of rolls, during or after the removal of ionic inorganic additives mentioned above, and widened or tensioned and stretched in a transverse direction with its edges gripped, in a heated oven in a known type of "stenter" apparatus. Or it is simultaneously stretched in two directions with a special stenter apparatus. The optimum draw ratio in each direction ranges from 1.1 to 2.0 for this film, depending on polymer composition, solvent content and drawing conditions. Furthermore, when a polymer solution of relatively low polymer concentration, e.g., less than 20%, is cast onto a moving metal surface, where the solvent is evaporated away with firm contact of the film on the metal surface, or when the film is removed of inorganic additives in the aqueous medium, where the film is prevented from free shrinkage, a sizable degree of planar orientation can be obtained. Such a high degree of planar orientation improves the hygroscopic dimensional stability, prevents the decrease of flexibility of the film of large crystallinity resulting from the heat treatment, which, in turn, can increase the degree of heat treatment, resulting in the decrease of water absorption, as well as tensile strength and modulus.

The heat treatment may be performed at any temperature above the glass transition point of the non-heat set film. This can be obtained by measuring its dynamic mechanical loss peak and is usually shown to be above 250° C, depending on polymer composition and solvent content. The film is heated in hot air or inert gas, or by an infrared heater, while it is constrained, stretched or prevented from free shrinkage in both directions. The optimum range of heat set temperature and time period is defined by the following four equations.

$1/T = 1.3 \times 10^{-3}$ $1/T = 1.75 \times 10^{-3}$ $\log t = 2730 \times \frac{1}{T} - 7.54$ $\log t = 1820 \times \frac{1}{T} - 1.36$ Here $T$ and $t$ are absolute temperature (°K) and time period (min.), respectively.

The areas outside of the above range may be inadequate because of thermal decomposition during the heat treatment, or insufficient crystallinity and decrease of flexibility.

The planar orientation coefficient is obtained by X-ray diffractometry, referred to in L. E. Alexander's "X-Ray Diffraction Methods in Polymer Science", sec. 4, pp. 198 (1909, Wiley-Interscience).

The most desirable way to obtain the degree of planar orientation is the X-ray pole figure method. Films of known thickness are stuck to a sample about 400μ thick by means of an amorphous adhesive such as Collodion. The sample is mounted on the pole figure goniometer stage, B-4, of a Rigaku Denki type D-8C X-ray diffractometer and scanned by the reflection method (Schulz method) or transmission method (Deckar method). The sample is rotated stepwise in increments of 2° from 90° to 10° around the Z-axis (machine direction, $\alpha$ rotation) and at each $\alpha$-position the sample is rotated within the film plane by 360° ($\beta$-rotation). Recording of diffraction intensity, calibration by absorption factor and orientation distribution, and drawing of the pole figure are aided by a computer. A strong diffraction peak is observed between 17 and 25° for this type of film, e.g. $2\theta = 21.5°$ for the polymer from terephthaloyl chloride and p-amino benzoyl hydrazide. So this diffraction intensity is measured for the pole figure. From the pole figure the planar orientation coefficient is calculated as the ratio of in-plane intensity to the total intensity for this diffraction peak.

Various methods are employed for density determination, but a density gradient tube with $CCl_4$-toluene has been used at 25° C in this case. the small pieces of samples are stored in a desiccator with $P_2O_5$ for 72 hours before the measurement.

The inherent viscosity, $\eta$inh, is defined by the following equation.

$$\eta inh = \frac{\ln (\eta_{rel})}{C}$$

where $\eta_{rel}$ represents the relative viscosity measured at 25° C and C represents a concentration of 0.5 g of the polymer in 100 ml of N-methyl pyrolidone and 2.5 g of lithium chloride.

The curl of a film, mentioned above, is defined in the following way. A sample strip of 3 cm by 10 cm is cut from the original film and hung down for 24 hours in a cell at a certain temperature and humidity. Then it is put on a flat glass surface at 25° C and 65% RH. The presence or absence of curl in this case is determined by whether the center or both edges are raised up by more than 2 mm.

Water absorption is measured as follows. A film sample is, at first, kept for more than 72 hours in a desiccator with $P_2O_5$ until a constant weight is reached. Then, the sample is kept in another cell, conditioned at 25° C and 75% RH for more than 48 hours until a constant weight is reached again. The weight increase of the sample with respect to the initial weight is determined to be the water absorption.

Hygroscopic dimensional change is measured in the following way. A tape of ½inch by 400 mm is conditioned at 20° C and 70% RH for 24 hours under 10g of load and then the humidity around the sample is changed to 90% RH and th length of the sample is measured continuously for more than 12 hours until the leveling off, by Japan Regulater, Inc.'s Tape Elongation Tester Type ITL-2. From this change in length, the hygroscopic linear expansion coefficient is calculated.

Tensile strength and modulus are measured on an "Instron" tensile tester at 20° C and 75% RH, based on JIS L-1073. The tensile modulus is obtained from the initial linear portion of the S-S curve.

The films of this invention are characterized by excellent thermal stability, mechanical strength, stiffness, electrical properties, dimensional stability, etc., as mentioned above. Those films can be applied to the areas of flexible printed circuit base, acoustic diaphragm, electrical insulation material (slot liner, cable lapping, etc.), adhesive tape base, magnetic tape or sheet base, capacitor, graphic material, photo or image process material and others.

The invention is illustrated by the following specific examples, which are intended to be illustrative and not to define or limit the scope of the invention, which is defined in the appended claims.

EXAMPLE 1

4.23 g of p-amino benzoyl hydrazide and 1.25 g of p-phenylene diamine are dissolved in a mixture of 150 ml of dried dimethyl acetamide and 3.5 g of lithium chloride. 8.12 g of finely pulverized terephthaloyl chloride is added to the solution at 0° C and stirred for 3 hours. Then, 2.36 g of lithium hydroxide is added to the reaction mixture at 30° C under stirring to neutralize the generated hydrogen chloride. This polymer solution is cast uniformly on a glass plate at room temperature and heated in air at 150° C for 10 minutes to evaporate dimethyl acetamide. The solvent content of the stripped film is 170% with respect to the net polymer weight. The film is fixed on a metal frame and dipped into a mixture of 20% of dimethyl acetamide and 80% of water at 40° C for 5 minutes. Then it is stretched simultaneously at a ratio of 1.05 in each direction by a T. M. Long film stretcher at 200° C. This film is heated at 300° C for 5 minutes and at 400° C for 2 seconds in air with fixed dimension. A thickness of 15 $\mu$, a density, after 80 hours in $P_2O_5$ of 1.450 g/cm$^3$ at 25° C and an inherent viscosity of 2.70 are obtained for this film. The planar orientation coefficient is measured and found to be 0.790 by the X-ray pole figure method. Water absorption of 2.0% at 25° C and 75% RH, hygroscopic linear expansion coefficient of 1.5 × 10$^{-5}$ mm/mm/% RH, Young's modulus of 1020 kg/mm$^2$, tensile strength of 36.5 kg/mm$^2$ and tensile elongation of 41% are obtained for the machine and transverse directions of the film.

This film is reduced to ash by the low temperature plasma method. The ash is dissolved in water and the lithium ion content is determined by flame analysis. Chlorine ion is determined by a silver nitrate solution, using potassium chromate as an indicator. From these results, the residual lithium chloride in the film is found to be 165 ppm. Other ionic inorganic residue is found to be below 50 ppm.

3 cm by 10 cm samples are cut out of the film in each direction and hung down for 75 hours in (1) desiccator with $P_2O_5$ at room temperature, (2) cell conditioned at 45° C and 80% RH and (3) cell conditioned at 25° C and 75% RH. Then they are immediately put on glass plates and the clearances between their centers (or both edges) and the glass plates are measured. The results obtained are (1) 0.11, (2) 0 mm, (3) 0 mm for each condition.

Tensile strength and elongation are shown to be 31 kg/mm$^2$ and 30%, after aging for 250 hours at 200° C in air.

EXAMPLE 2

6.66 g of p-amino benzoyl hydrazide and 4.26 g of terephthaloyl dihydrazide are dissolved in a mixture of 300 ml of dried N-methyl pyrolidone and 7.20 g of lithium chloride. 13.41 g of terephthaloyl chloride is added to the solution kept at 0° C, and stirred for 2.5 hours. Then 4.55 g of pulverized lithium hydroxide monohydrate is added to the reaction mixture and stirred for 1 hour. This polymer solution is cast uniformly on a glass plate at room temperature and the glass plate with the polymer film is dipped into water containing 10% of N-methyl pyrolidone at 40° C for 4 minutes. The film is heated at 250° C for 2 minutes in air with constant dimension and then stretched unidirectionally to × 1.5 at 380° C within 10 seconds under constraint in the cross direction. The following data are obtained.

| | |
|---|---|
| Thickness | 12$\mu$ |
| Density | 1.451 g/cm$^3$ |
| Planar orientation coefficient | 0.820 |
| $\eta_{inh}$ | 3.0 |
| LiCl residue | 200 ppm |
| Tensile strength | 54 kg/mm$^2$ |
| | (stretched direction) |
| | 33 kg/mm$^2$ |
| | (cross direction) |
| Young's modulus | 2500 kg/mm$^2$ |
| | (stretched direction) |
| | 900 kg/mm$^2$ |
| | (cross direction) |
| Water absorption | 2.55% |
| Hygroscopic linear expansion coefficient | 0.6×10$^{-5}$ mm/mm/%RH |
| | (stretch direction) |
| Curl | No |

EXAMPLE 3

9.71 g of terephthaloyl dihydrazide and 5.41 g of p-phenylene diamine are dissolved in a mixture of 500 ml of dehydrated dimethyl acetamide and 17.0 g of lithium chloride. 20.3 g of terephthaloyl chloride are added to the solution at −25° C and stirred for 1 hour. Then 27.0 g of dimethyl aniline are added to this reaction mixture and stirred for 1 hour. This solution is spread uniformly on a stainless steel plate and heated for 10 minutes at 130° C in air. The film, containing 150% of dimethyl acetamide, is stripped from the plate and dipped in an aqueous mixture containing 30% of N-methyl pyrolidone, for 5 minutes and in pure water at 40° C for 5 minutes. This film is drawn in one direction by 1.3 at room temperature while allowing free shrinkage in the transverse direction and heated at 320° C for 3 minutes with fixed dimension in the two directions. Then, this film is also drawn in the transverse direction by 1.3 in 15 seconds at 400° C under constraint in the other direction. The following data are obtained for this film.

| | |
|---|---|
| Thickness | 13$\mu$ |
| Density | 1.447 g/cm$^3$ |
| Planar orientation coefficient | 0.870 |
| LiCl residue | 150 ppm |
| Tensile strength | 42 kg/mm$^2$ |
| | (both directions) |
| Young's modulus | 1350 kg/mm$^2$ |
| | (both directions) |
| Water absorption | 2.95% |

| | |
|---|---|
| Hygroscopic linear expansion coefficient | $0.9 \times 10^{-5}$ mm/mm/% RH |
| Curl | No |

EXAMPLE 4

Polyamide hydrazide is prepared from 50 mol % of terephthaloyl dihydrazide, 50 mol % of p-phenylene diamine and 100 mol % of terephthaloyl chloride. The polymer solution, of 5.1 weight % of the above polyamide hydrazide ($\eta_{inh} = 4.2$), 3.1 weight % of lithium chloride and 91.8 weight % of N-methyl pyrolidone, is cast uniformly onto a stainless steel drum rotating in a heated air oven, to a wet thickness of 350 $\mu$ and a width of 300 mm, and dried for 5 minutes at 200° C in air. The solvent content of the film, when stripped from the drum, is 210% based on the net polymer weight. The film is dipped into an aqueous bath, containing 40 weight % of N-methyl pyrolidone for 3 minutes at room temperature and then into water for 5 minutes at 50° C. It is led into an air oven at 280° C for 5 minutes at 400° C for 2 seconds under constraint.

The following data are obtained for this film.

| | |
|---|---|
| Thickness | 13$\mu$ |
| Density | 1.450 g/cm$^3$ |
| Planar orientation coefficient | 0.76 |
| $\eta_{inh}$ | 3.27 |
| LiCl residue | 200 ppm |
| Tensile strength | 38 kg/mm$^2$ |
| Young's modulus | 980 kg/mm$^2$ |
| Water absorption | 3.0% |
| Hygroscopic linear expansion coefficient | $1.85 \times 10^{-5}$ mm/mm/% RH |
| Curl | No |

EXAMPLE 5

10.80 g of p-phenylene diamine and 20.0 g of dehydrated calcium chloride are dissolved in 500 ml of dimethyl acetamide. 23.75 g of 2-chloro-terephthaloyl chloride are added to this solution and stirred for 2 hours at $-10°$ C. The reaction mixture is poured into water in a juicer, washed by water and acetone and dried for 24 hours at 70° C in vacuum. A mixture of 30 g of this polymer and 18 g of dehydrated calcium chloride is dissolved in 500 ml of dimethyl acetamide at room temperature. Th solution is spread uniformly on a glass plate and heated at 90° C for 15 minutes in air circulation of 2 m/sec. The self-supporting film is peeled from the plate and dipped into water containing 30% of dimethyl acetamide for 5 minutes at room temperature, then into 1/10 N hydrochloric acid solution for 3 minutes at room temperature and into water for 5 minutes at 70° C. Then, the film is heated for 3 minutes at 300° C and for 5 seconds in air at 420° C under constraint. The thickness of the final film is 15 $\mu$. This film is reduced to ash by the low temperature plasma method. The ash is dissolved in water and for this solution the calcium ion content is determined by chelate titration with EDTA and chlorine ion is determined by silver nitrate solution. From these results the residual calcium chloride in this film is calculated to be 290 ppm. The retention of tensile strength and elongation after 300 hours aging at 200° C in air, is 85% and 80% respectively.

Other data are listed below.

| | |
|---|---|
| Density | 1.479 g/cm$^3$ |
| Planar orientation coefficient | 0.77 |
| $\eta_{inh}$ | 2.43 |
| Tensile strength | 36 kg/mm$^2$ |
| Young's modulus | 1360 kg/mm$^2$ |
| Water absorption | 1.4% |
| Hygroscopic linear expansion coefficient | $0.75 \times 10^{-5}$ mm/mm/% RH |
| Curl | No |

EXAMPLE 6

12.825 of 2-chloro-p-phenylene diamine, 1.080 g of m-phenylene diamine and 8.40 g of dehydrated lithium chloride are dissolved in 500 ml of N-methyl pyrolidone. 20.303 g of pulverized terephthaloyl chloride are added to this solution and stirred for two hours at 5° C. Then, 7.40 g of lithium carbonate is added to the reaction mixture under stirring to neutralize the generated hydrochloric acid at room temperature. The $\eta_{inh}$ of this polymer is 4.57. The solution is cast uniformly on a glass plate at room temperature and heated at 120° C in air for 15 minutes to evaporate N-methyl pyrolidone. The solvent content of the peeled film is about 200%, based on the net polymer weight. The film is fixed on a frame and dipped into a mixture of 30% of N-methyl pyrolidone and 70% of water at 45° C for 5 minutes, and then into 1/10 N hydrochloric acid for 3 minutes at room temperature and finally into water at 50° C for 5 minutes. The film, fixed on the frame, is heated at 300° C for 3 minutes and at 450° C for 5 seconds. The thickness of the film is 30 $\mu$.

The data are listed below.

| | |
|---|---|
| Density | 1.475 g/cm$^3$ |
| Planar orientation coefficient | 0.76 |
| $\eta_{inh}$ | 5.33 |
| LiCl residue | 450 ppm |
| Tensile strength | 38 kg/mm$^2$ |
| Young's modulus | 1330 kg/mm$^2$ |
| Water absorption | 1.1% |
| Hygroscopic linear expansion coefficient | $0.6 \times 10^{-5}$ mm/mm/% RH |
| Curl | No |
| Retention of tensile strength after 300 hours' aging at 250° C | 58% |

The following is claimed:

1. An aromatic polyamide-type film, substantially consisting of a member of the group consisting of at least one of p-benzamide, p-phenylene terephthalamide and terephthaloyl hydrazide recurring units as essential chain constituents, which constituents comprise at least about 70 mol % of the entire film, and which have an inherent viscosity of more than 1.0 at 25° C, a density of more than 1.41 g/cm$^3$ at 25° C and 0% relative humidity and a planar orientation coefficient of larger than 0.65, obtained by the X-ray pole figure method, said film being substantially free of organic solvent and inorganic ionic compounds, and having been prepared by heating to the polymer crystallization temperatures while preventing free shrinkage in the machine direction and in the transverse direction.

2. Aromatic polyamide-type films of claim 1, which have a density of more than 1.44 g/cm$^3$ at 25° C and 0% relative humidity.

3. Aromatic polyamide-type films of claim 1, which have a planar orientation coefficient larger than 0.75, obtained by the X-ray pole figure method.

4. Aromatic polyamide-type films of claim 1, which have an ionic inorganic residue of less than 500 ppm, consisting of sulfuric acid, alkali metal halides, alkali metal nitrates, alkali earth metal halides and/or alkali earth metal nitrates.

5. Aromatic polyamide-type films of claim 1, consisting of p-benzamide (A), p-phenylene terephthalamide (PT), and terephthaloyl hydrazide (HT) recurring units whole molar ratio is defined by the area upon and within the area defined by lines connecting the points P, Q, R and S in FIG. 1, where
P: HT/A/PT = 75/0/25 mol %
Q: HT/A/PT = 75/25/0
R: HT/A/PT = 50/50/0
S: HT/A/PT = 0/0/100

6. Aromatic polyamide-type films of claim 1, which have a tensile strength of more than 30 kg/mm$^2$, a tensile modulus of greater than 600 kg/mm$^2$ both in the machine and transverse direction, a water absorption of less than 3.0% by weight at 25° C and 75% relative humidity and a hygroscopic linear expansion coefficient of less than $2.0 \times 10^{-5}$ mm/mm/% relative humidity at least in one direction.

7. The method of manufacturing aromatic polyamide-type films, consisting of at least one member selected from the group consisting of p-benzamide, p-phenylene terephthalamide and terephthaloyl hydrazide recurring units as essential chain constituents, which constituents comprise at least about 70 mol % of the entire film, comprising the removal of organic solvents and inorganic compounds from the polymer films, and heating to their crystallization temperatures, while preventing free shrinkage in the machine and in the transverse direction, so that the treated films have a density of more than 1.41 g/cm$^3$ at 25° C and 0% relative humidity, an inherent viscosity of more than 1.0 at 25° C and a planar orientation coefficient of more than 0.65, obtained by the X-ray pole figure method.

8. The method of manufacturing aromatic polyamide-type films of claim 7, comprising the removal of organic solvents and inorganic compounds from the polymer films and heating to their crystallization temperatures, while preventing free shrinkage, so that the treated films have a density of more than 1.44 g/cm$^3$ at 25° C and 0% relative humidity, an inherent viscosity of more than 1.0 at 25° C and a planar orientation coefficient of more than 0.75, obtained by the X-ray pole figure method.

9. The method of manufacturing aromatic polyamide-type films of claim 7, consisting of p-benzamide (A), p-phenylene terephthalamide (PT) and terephthaloyl hydrazide (HT) recurring units, whose molar ratio is defined by the area on and within the area defined by lines connecting the points P, Q, R and S in FIG. 1, where
P: HT/A/PT = 75/0/25 mol %
Q: HT/A/PT = 75/25/0
R: HT/A/PT = 50/50/0
S: HT/A/PT = 0/0/100

10. The method of manufacturing aromatic polyamide-type films of claim 7, comprising the heating of films, removed of inorganic compounds, within the range enclosed by the following equations:

$$1/T = 1.3 \times 10^{-3}$$

$$1/T = 1.75 \times 10^{-3}$$

$$\log t = 2730 \times \frac{1}{T} - 7.54$$

$$\log t = 1820 \times \frac{1}{T} - 1.36$$

where $T$ and $t$ are absolute temperature (°K) and time period (min).

11. The method of manufacturing aromatic polyamide-type films of claim 7, comprising the evaporation of an organic solvent from the cast film until the attainment of self-supporting of the film, wherein the solvent content is more than 50% based on the weight of net polymer, and the removal of inorganic compounds from the polymer films by extracting at 40° to 80° C with an aqueous mixture containing an organic solvent by 10 to 70%, based on the total weight of the mixture, which can dissolve or swell the said films.

* * * * *